United States Patent
Lee et al.

(10) Patent No.: US 9,704,648 B2
(45) Date of Patent: Jul. 11, 2017

(54) MULTILAYER CERAMIC CAPACITOR, MANUFACTURING METHOD THEREOF, AND BOARD HAVING THE SAME

(71) Applicant: SAMSUNG ELECTRO-MECHANICS CO., LTD., Suwon-si, Gyeonggi-Do (KR)

(72) Inventors: Jong Ho Lee, Suwon-Si (KR); Myung Jun Park, Suwon-Si (KR); Doo Young Kim, Suwon-Si (KR); Chang Hoon Kim, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 135 days.

(21) Appl. No.: 14/527,400

(22) Filed: Oct. 29, 2014

(65) Prior Publication Data
US 2016/0005539 A1     Jan. 7, 2016

(30) Foreign Application Priority Data
Jul. 7, 2014  (KR) .................. 10-2014-0084472

(51) Int. Cl.
*H01G 4/228* (2006.01)
*H01G 2/06* (2006.01)
(Continued)

(52) U.S. Cl.
CPC .......... *H01G 2/065* (2013.01); *H01G 4/232* (2013.01); *H01G 4/30* (2013.01); *H01G 4/012* (2013.01); *H01G 4/1227* (2013.01)

(58) Field of Classification Search
CPC ......... H01G 4/228; H01G 4/232; H01G 4/252
(Continued)

(56) References Cited

U.S. PATENT DOCUMENTS

| 4,771,520 A * | 9/1988 | Tanaka | H01G 4/30 29/25.42 |
| 2007/0142209 A1* | 6/2007 | Ito | B32B 18/00 501/137 |

(Continued)

FOREIGN PATENT DOCUMENTS

| JP | 06-204076 A | 7/1994 |
| JP | 7-211575 A | 8/1995 |

(Continued)

OTHER PUBLICATIONS

Japanese Office Action dated Feb. 2, 2016, issued in Japanese patent application No. 2014-210542 (w/ English translation).
(Continued)

*Primary Examiner* — Eric Thomas
(74) *Attorney, Agent, or Firm* — McDermott Will & Emery LLP

(57) ABSTRACT

A multilayer ceramic capacitor may include: a ceramic body having first and second main surfaces opposing each other in a thickness direction and first and second end surfaces opposing each other in a length direction, a thickness of the ceramic body being greater than a width thereof; a first external electrode disposed on the first end surface and having a greater thickness in a region thereof adjacent to the second main surface than in a region thereof adjacent to the first main surface; a second external electrode disposed on the second end surface and having a greater thickness in a region thereof adjacent to the second main surface than in a region thereof adjacent to the first main surface; and first and second internal electrodes disposed in the ceramic body and connected to the first and second external electrodes, respectively.

10 Claims, 5 Drawing Sheets

(51) Int. Cl.
*H01G 4/30* (2006.01)
*H01G 4/232* (2006.01)
*H01G 4/012* (2006.01)
*H01G 4/12* (2006.01)

(58) Field of Classification Search
USPC .................................................. 361/306.3
See application file for complete search history.

(56) References Cited

U.S. PATENT DOCUMENTS

| | | | |
|---|---|---|---|
| 2007/0149382 A1* | 6/2007 | Ito | H01G 4/1209 501/137 |
| 2007/0155613 A1* | 7/2007 | Ito | C04B 35/468 501/137 |
| 2008/0112109 A1* | 5/2008 | Muto | C04B 35/4682 361/301.4 |
| 2012/0147516 A1 | 6/2012 | Kim et al. | |
| 2012/0152604 A1 | 6/2012 | Ahn et al. | |
| 2012/0188682 A1* | 7/2012 | Sato | H01G 4/232 361/305 |
| 2013/0038979 A1* | 2/2013 | Togashi | H01G 4/30 361/301.4 |
| 2013/0208398 A1* | 8/2013 | Tanaka | H01G 4/306 361/301.4 |

FOREIGN PATENT DOCUMENTS

| | | |
|---|---|---|
| JP | 09-260184 A | 10/1997 |
| JP | 09260184 A * | 10/1997 |
| JP | 2000-068148 A | 3/2000 |
| JP | 2007-134375 A | 5/2007 |
| JP | 2012-134498 A | 7/2012 |
| JP | 2014-033097 A | 2/2014 |
| KR | 10-0586962 B1 | 6/2006 |
| KR | 10-1141457 B1 | 5/2012 |

OTHER PUBLICATIONS

Korean Office Action dated Nov. 18, 2015, issued in Korean patent application No. 10-2014-0084472 (w/ English translation).

* cited by examiner

A-A'

B-B'

MULTILAYER CERAMIC CAPACITOR, MANUFACTURING METHOD THEREOF, AND BOARD HAVING THE SAME

CROSS-REFERENCE TO RELATED APPLICATION

This application claims the benefit of Korean Patent Application No. 10-2014-0084472 filed on Jul. 7, 2014, with the Korean Intellectual Property Office, the disclosure of which is incorporated herein by reference.

BACKGROUND

The present disclosure relates to a multilayer ceramic capacitor, a manufacturing method thereof, and a board having the same.

A multilayer ceramic capacitor may include a plurality of stacked dielectric layers, internal electrodes disposed to face each other with the respective dielectric layers interposed therebetween, and external electrodes electrically connected to the internal electrodes.

A multilayer ceramic capacitor may be mounted on a board to be used. At the time of mounting the multilayer ceramic capacitor on the board, a mounting pad on a circuit board and the external electrodes may be electrically connected to each other through soldering, and the mounting pad may be connected to other external circuits through wiring patterns or conductive vias in the board.

In a case in which the multilayer ceramic capacitor topples over or the multilayer ceramic capacitor is misaligned when being mounted on the board, a mounting defect may occur, and short-circuits due to contact with an electronic component adjacent thereto may occur.

RELATED ART DOCUMENT (Patent Document 1) Korean Patent Publication No. 10-0586962

SUMMARY

An exemplary embodiment in the present disclosure may provide a multilayer ceramic capacitor, a manufacturing method thereof, and a board having the same.

According to an exemplary embodiment in the present disclosure, a multilayer ceramic capacitor may include: a ceramic body having a thickness greater than a width thereof; internal electrodes disposed in the ceramic body; and external electrodes disposed on outer surfaces of the ceramic body.

In the multilayer ceramic capacitor according to an exemplary embodiment in the present disclosure, the external electrodes disposed on end surfaces of the ceramic body in a length direction are thicker in regions thereof adjacent to a lower surface, a mounting surface of the ceramic body, as compared to the remaining portions thereof, such that mounting stability of the multilayer ceramic capacitor may be improved.

In the multilayer ceramic capacitor according to an exemplary embodiment in the present disclosure, the center of gravity of the multilayer ceramic capacitor may be disposed below the center of gravity of the ceramic body.

According to an exemplary embodiment in the present disclosure, a board having a multilayer ceramic capacitor may include: a printed circuit board having first and second electrode pads formed thereon; and the multilayer ceramic capacitor as described above, mounted on the printed circuit board.

The multilayer ceramic capacitor may include a ceramic body having first and second main surfaces opposing each other in a thickness direction and first and second end surfaces opposing each other in a length direction, a thickness of the ceramic body being greater than a width thereof; a first external electrode disposed on the first end surface and having a greater thickness in a region thereof adjacent to the second main surface than in a region thereof adjacent to the first main surface; a second external electrode disposed on the second end surface and having a greater thickness in a region thereof adjacent to the second main surface than in a region thereof adjacent to the first main surface; and first and second internal electrodes disposed in the ceramic body and connected to the first and second external electrodes, respectively.

The multilayer ceramic capacitor may be mounted such that a lower surface of the ceramic body is adjacent to and faces the printed circuit board.

BRIEF DESCRIPTION OF DRAWINGS

The above and other aspects, features and other advantages in the present disclosure will be more clearly understood from the following detailed description taken in conjunction with the accompanying drawings, in which.

DETAILED DESCRIPTION

Figure 1:
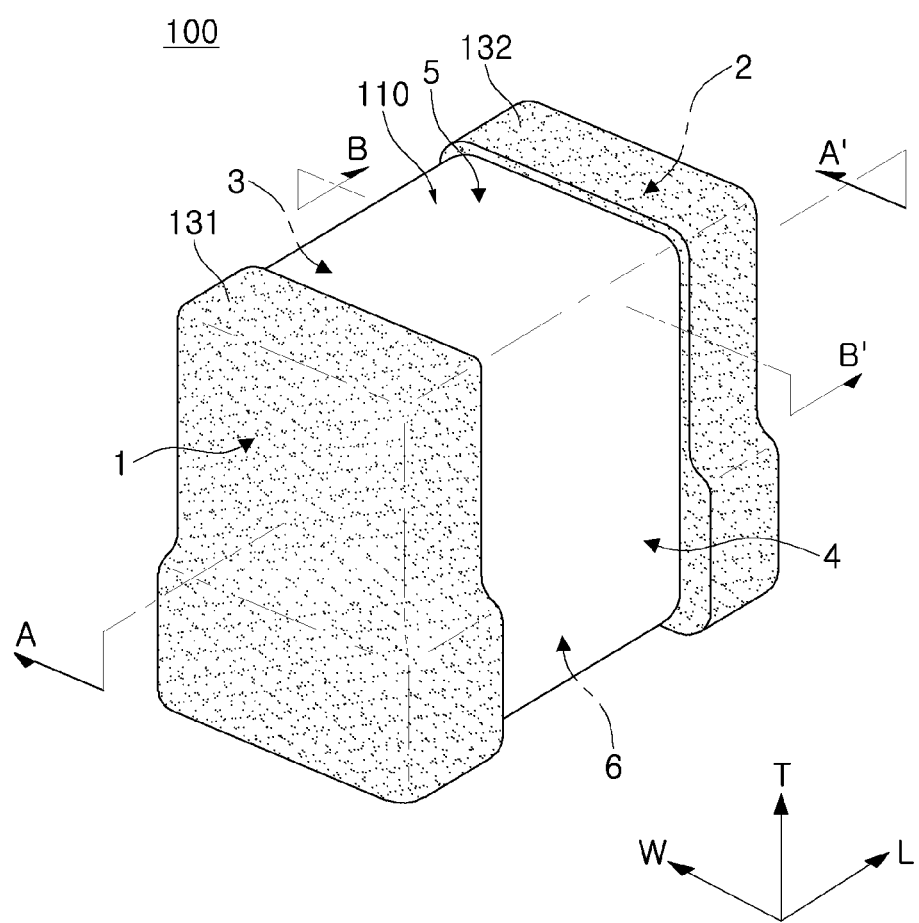
FIG. 1 is a perspective view schematically illustrating a multilayer ceramic capacitor according to an exemplary embodiment in the present disclosure.

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Capacitor 100

Figure 2:
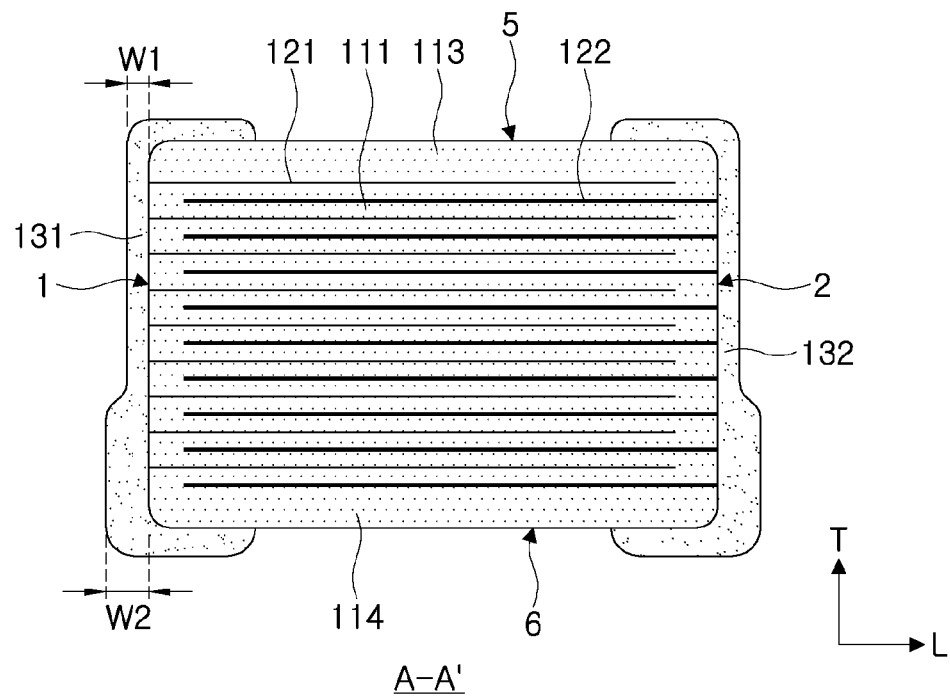
FIG. 2 is a cross-sectional view taken along line A-A' of FIG. 1.

FIG. 1 is a perspective view schematically illustrating a multilayer ceramic capacitor according to an exemplary embodiment in the present disclosure, and FIG. 2 is a cross-sectional view taken along the line A-A' of FIG. 1.

Referring to FIGS. 1 and 2, the multilayer ceramic capacitor 100 according to an exemplary embodiment in the present disclosure may include a ceramic body 110; and external electrodes 131 and 132.

As shown in FIGS. 1 and 2, the external electrodes 131 and 132 may be disposed on outer surfaces of the ceramic body 110, while thicknesses of the external electrodes may be different in a thickness direction of the ceramic body.

For example, portions of the external electrodes 131 and 132 adjacent to one surface of the ceramic body 110 in the thickness direction may be formed to be thicker than other portions thereof adjacent to the other surface of the ceramic body in the thickness direction.

In a case in which portions of the external electrodes 131 and 132 adjacent to one surface of the ceramic body 110 are thicker than other portions thereof adjacent to the other surface of the ceramic body in the thickness direction as described above, when the ceramic capacitor is mounted on a board, a phenomenon in which the chip topples over may be decreased, such that mounting stability may be secured.

Hereinafter, the multilayer ceramic capacitor 100 according to an exemplary embodiment in the present disclosure will be described in more detail.

According to an exemplary embodiment in the present disclosure, a T-direction shown in FIGS. 1 and 2 refers to the thickness direction of the ceramic body 110, an L-direction refers to a length direction of the ceramic body 110, and a W-direction refers to a width direction of the ceramic body 110.

In addition, the multilayer ceramic capacitor 100 according to an exemplary embodiment in the present disclosure may be mounted on a board such that the thickness (T)-direction of the ceramic body 110 may be disposed to be perpendicular to the board.

Referring to FIGS. 1 and 2, the ceramic body 110 may include a plurality of dielectric layers 111 and have first and second end surfaces 1 and 2 opposing each other in the length direction, first and second side surfaces 3 and 4 opposing each other in the width direction, and first and second main surfaces 5 and 6 opposing each other in the thickness direction. A shape of the ceramic body 110 is not particularly limited. The ceramic body 110 does not have a hexahedral shape having completely straight lines but may have a substantially hexahedral shape as shown FIG. 1.

According to an exemplary embodiment in the present disclosure, the second main surface 6 may be a mounting surface adjacent to and facing a printed circuit board when the multilayer ceramic capacitor is mounted on the printed circuit board.

The ceramic body 110 may be formed by stacking the plurality of dielectric layers 111. As shown in FIG. 2, the ceramic body may include internal electrodes 121 and 122 formed on the dielectric layers 111 and be formed by stacking the plurality of dielectric layers on which the internal electrodes are formed. The internal electrodes may include first and second internal electrodes 121 and 122. The first and second internal electrodes 121 and 122 may be alternately disposed on the dielectric layers 111, while each of the dielectric layers 111 may be interposed between the plurality of first and second electrodes.

The first internal electrodes 121 may be exposed to the first end surface 1 of the ceramic body, and the second internal electrodes 122 may be exposed to the second end surface 2 of the ceramic body.

In addition, the ceramic body 110 may include cover parts 113 and 114 disposed outwardly of the outermost internal electrodes in order to protect the internal electrodes from external impacts.

The multilayer ceramic capacitor according to an exemplary embodiment in the present disclosure may be formed such that a thickness (T) of the ceramic body 110 is greater than a width (W) thereof in order to implement high capacitance.

A general multilayer ceramic capacitor is commonly manufactured such that a width and a thickness thereof are almost equal to each other.

However, the multilayer ceramic capacitor 100 according to an exemplary embodiment in the present disclosure may implement high capacitance while securing a sufficient space at the time of being mounted on a board due to an increase in the thickness of the ceramic body 110.

However, in a case in which the thickness of the ceramic body 110 is greater than the width thereof as in an exemplary embodiment in the present disclosure, high capacitance may be secured, but since the center of gravity of the multilayer ceramic capacitor may be raised, at the time of mounting the multilayer ceramic capacitor on the board, a chip may be inclined in a taping pocket during a pick-up process, such that a defect in which the chip is not picked-up may occur, or a phenomenon in which the chip topples over may frequently occur during a mounting process.

However, according to an exemplary embodiment in the present disclosure, when portions of the external electrodes 131 and 132 adjacent to the second main surface 6 of the ceramic body corresponding to the mounting surface on a board are thicker than the other portions of the external electrodes 131 and 132 adjacent to the first main surface 5 of the ceramic body, the limitation as described above may be solved.

According to an exemplary embodiment in the present disclosure, an average thickness of the dielectric layers 111 may be arbitrarily changed according to a capacitance design of the multilayer ceramic capacitor.

Further, the dielectric layers 111 may contain a ceramic powder having high permittivity, for example, a barium titanate ($BaTiO_3$) based powder or strontium titanate ($SrTiO_3$) based powder, or the like, but the present disclosure is not limited thereto.

The cover parts 113 and 114 may contain the same material and have the same configuration as those of the dielectric layers 111 except that the internal electrodes are not included therein. The cover parts may be formed by stacking a single dielectric layer or two or more dielectric layers and may basically serve to prevent the first and second internal electrodes 121 and 122 from being damaged by physical or chemical stress.

The first and second internal electrodes 121 and 122 may be formed of a conductive paste containing at least one of, for example, a noble metal material such as palladium (Pd), a palladium-silver (Pd—Ag) alloy, or the like, nickel (Ni), and copper (Cu), but are not limited thereto.

Meanwhile, the first and second internal electrodes 121 and 122, pairs of electrodes having different polarities from each other, may be formed by printing the conductive paste containing a conductive metal on the dielectric layers 111 at a predetermined thickness.

An average thickness of the first and second internal electrodes 121 and 122 after a sintering process is not particularly limited as long as capacitance may be formed.

The ceramic body 110 may be formed by stacking the plurality of dielectric layers 111 and the internal electrodes 121 and 122. In this case, a shape and dimensions of the ceramic body 110 and the number of stacked dielectric layers 111 are not limited to those of the embodiment shown in the accompanying drawings.

The multilayer ceramic capacitor according to an exemplary embodiment in the present disclosure may be formed such that the thickness (T) and the width (W) of the ceramic body 110 are not substantially identical to each other, and the thickness (T) is greater than the width (W) in order to implement high capacitance.

The multilayer ceramic capacitor 100 according to an exemplary embodiment in the present disclosure may implement high capacitance without an increase in a mounting area at the time of being mounted on a board due to an increase in the thickness of the ceramic body 110.

According to an exemplary embodiment in the present disclosure, the dielectric layers 111 and the internal electrodes 121 and 122 may be stacked in the thickness (T) direction of the ceramic body as shown in FIG. 2.

In a case in which the internal electrodes 121 and 122 are stacked in the thickness direction of the ceramic body 110 and the thickness of the ceramic body is increased as shown in FIG. 2, the number of the internal electrodes 121 and 122 stacked therein may be increased. Therefore, when the multilayer ceramic capacitor is mounted on a printed circuit board, even without an increase in an area occupied by the multilayer ceramic capacitor on the printed circuit board, capacitance may be increased.

In a case in which the internal electrodes 121 and 122 are stacked in the thickness direction of the ceramic body 110, the first and second internal electrodes 121 and 122 may be disposed in parallel to the first or second main surface 5 or 6 of the ceramic body. For example, when the multilayer ceramic capacitor is mounted on the printed circuit board, the first and second internal electrodes 121 and 122 may be disposed in parallel to the second main surface 6 (mounting surface), a surface facing the printed circuit board.

The number of the stacked dielectric layers 111 is not particularly limited. However, in a case in which the dielectric layers and the internal electrodes are stacked in the thickness direction of the ceramic body, the dielectric layers 111 may be stacked in an amount of 500 layers or more, for example. In a case in which the dielectric layers are stacked in the thickness direction of the ceramic body, the number of the stacked dielectric layers 111 may be 500 or more as described above, such that a high capacitance multilayer ceramic capacitor in which the thickness (T) of the ceramic body is greater than the width thereof may be implemented.

According to an exemplary embodiment in the present disclosure, the external electrodes 131 and 132 may include a first external electrode 131 connected to the first internal electrodes 121 and a second external electrode 132 connected to the second internal electrodes 122. The first external electrode 131 may be disposed on the first end surface of the ceramic body and include a band portion extended from the first end surface to the first and second main surfaces and the first and second side surfaces of the ceramic body.

The second external electrode 132 may be disposed on the second end surface of the ceramic body and include a band portion extended from the second end surface to the first and second main surfaces and the first and second side surfaces of the ceramic body.

Portions of the first and second external electrodes 131 and 132 disposed on the first and second end surfaces may have non-uniform thicknesses in the thickness direction of the ceramic body.

In the first and second external electrodes 131 and 132 disposed on the first and second end surfaces, regions thereof adjacent to the second main surface may be formed to be relatively thicker than regions thereof adjacent to the first main surface.

For example, as shown in FIG. 2, in the external electrode disposed on the first end surface of the ceramic body, when a thickness of a region thereof adjacent to the first main surface of the ceramic body is defined as W1, and a thickness of a region thereof adjacent to the second main surface of the ceramic body is defined as W2, W1 may be smaller than W2 (W1<W2).

According to an exemplary embodiment in the present disclosure, when a maximum thickness of upper portions of the first and second external electrodes 131 and 132 is defined as a, and a maximum thickness of lower portions of the first and second external electrodes 131 and 132 is defined as b, $1.5 \le b/a \le 4$ may be satisfied.

The maximum thickness of the upper portions of the first and second external electrodes 131 and 132 may be defined as a maximum thickness of the first and second external electrodes disposed on upper portions of the first and second end surfaces 1 and 2 of the ceramic body, and the maximum thickness of the lower portions of the first and second external electrodes 131 and 132 may be defined as a maximum thickness of the first and second external electrodes disposed on lower portions of the first and second end surfaces 1 and 2 of the ceramic body.

The upper and lower portions may be distinguished in the thickness direction of the ceramic body based on the center of the ceramic body in the thickness direction (a point corresponding to half of the thickness of the ceramic body). In the thickness direction of the ceramic body, a region above the center of the ceramic body in the thickness direction may be defined as the upper portion, and a region below the center of the ceramic body in the thickness direction may be defined as the lower portion.

In a case in which b/a is less than 1.5, an effect of improving mounting stability of the multilayer ceramic capacitor caused by an increase in the thickness of the lower portion of the external electrode may rarely be exhibited. In a case in which b/a is greater than 4, a capacitance implementation area may be decreased due to the increase in the thickness of the external electrode, such that a capacitance defect may occur.

Figure 3:
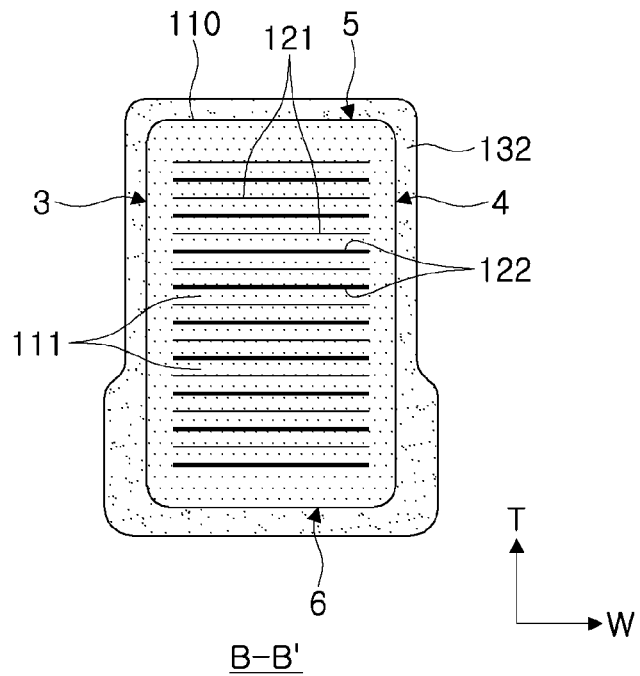
FIG. 3 is a cross-sectional view taken along line B-B' of FIG. 1.

FIG. 3 is a cross-sectional view taken along line B-B' of FIG. 1.

As shown in FIG. 3, according to an exemplary embodiment in the present disclosure, the band portion of the external electrode disposed on the first and second side surfaces 3 and 4 of the ceramic body may be formed to be thicker in a region thereof adjacent to the second main surface 6 of the ceramic body than in a region thereof adjacent to the first main surface 5 of the ceramic body.

Unlike an exemplary embodiment in the present disclosure, in a case in which external electrodes are substantially symmetrical with respect to each other about a central portion of the ceramic body in a thickness direction, the center of gravity of a multilayer ceramic capacitor may be formed in a position similar to that of the center of gravity of the ceramic body. However, in a case in which regions of external electrodes adjacent to amounting surface of a ceramic body are relatively thick as in an exemplary embodiment in the present disclosure, the center of gravity of a multilayer ceramic capacitor may be moved downwardly in a thickness direction of the ceramic body, such that mounting stability may be obtained when the multilayer ceramic capacitor is mounted on a board.

As described above, according to an exemplary embodiment in the present disclosure, the external electrode is formed to be biased downwardly in the thickness direction of the ceramic body, such that the center of gravity of the multilayer ceramic capacitor may be disposed below the center of gravity of the ceramic body in the thickness direction. Therefore, a phenomenon in which a chip topples over when being mounted on a board may be decreased, such that mounting stability may be secured.

Figure 4:
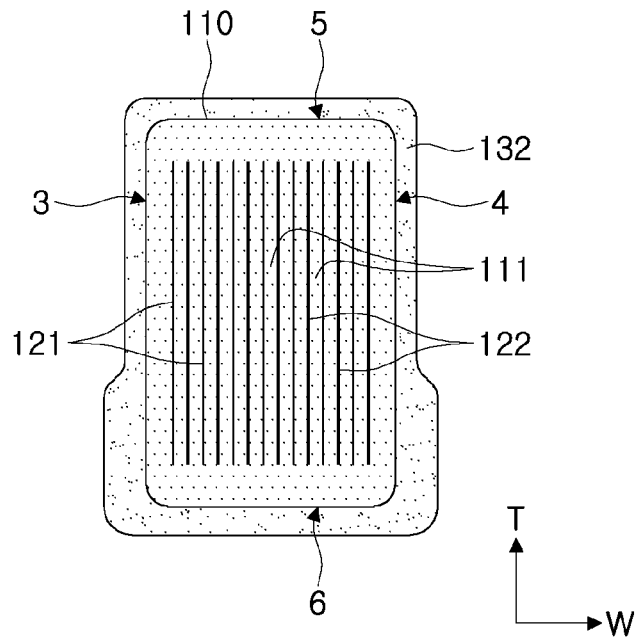
FIG. 4, a cross-sectional view of the multilayer ceramic capacitor according to an exemplary embodiment in the present disclosure in a width-thickness direction, illustrates a modified example of a stacking direction of internal electrodes and dielectric layers.

FIG. 4, a cross-sectional view of the multilayer ceramic capacitor according to an exemplary embodiment in the present disclosure in a width-thickness direction, illustrates a modified example of a stacking direction of the internal electrodes 121 and 122 and the dielectric layers 111. As illustrated in FIG. 4, the internal electrodes 121 and 122 and the dielectric layers 111 may be stacked in the width (W) direction of the ceramic body.

In the modified example of FIG. 4, the thickness (T) direction refers to a direction perpendicular with respect to a board when the multilayer ceramic capacitor 100 according to an exemplary embodiment in the present disclosure is mounted on the board.

In a case in which the internal electrodes 121 and 122 are stacked in the width direction of the ceramic body 110 as shown in FIG. 4 and the thickness of the ceramic body 110 is increased, an area of an overlapped region between the internal electrodes 121 and 122 may be increased. Therefore, even in a case in which an area occupied by the multilayer ceramic capacitor mounted on a board is identical to that of the case in which the internal electrodes 121 and 122 are stacked in the thickness direction of the ceramic body 110, further increased capacitance may be secured. In addition, since high capacitance may be secured by increasing the area of the overlapped region without significantly increasing the number of stacked internal electrodes, a current path may be decreased, such that equivalent serial inductance (ESL) may be decreased as compared to the case in which the internal electrodes are stacked in the thickness direction.

In a case in which the internal electrodes 121 and 122 are stacked in the width direction of the ceramic body 110 as shown in FIG. 4, the first and second internal electrodes 121 and 122 may be disposed to be perpendicular with respect to the first or second main surface 5 or 6 of the ceramic body. That is, at the time of mounting the multilayer ceramic capacitor on a board, the first and second internal electrodes 121 and 122 may be disposed to be perpendicular with respect to the second main surface 6 (mounting surface), the surface facing the board.

Manufacturing Method of Multilayer Ceramic Capacitor

Figure 5:
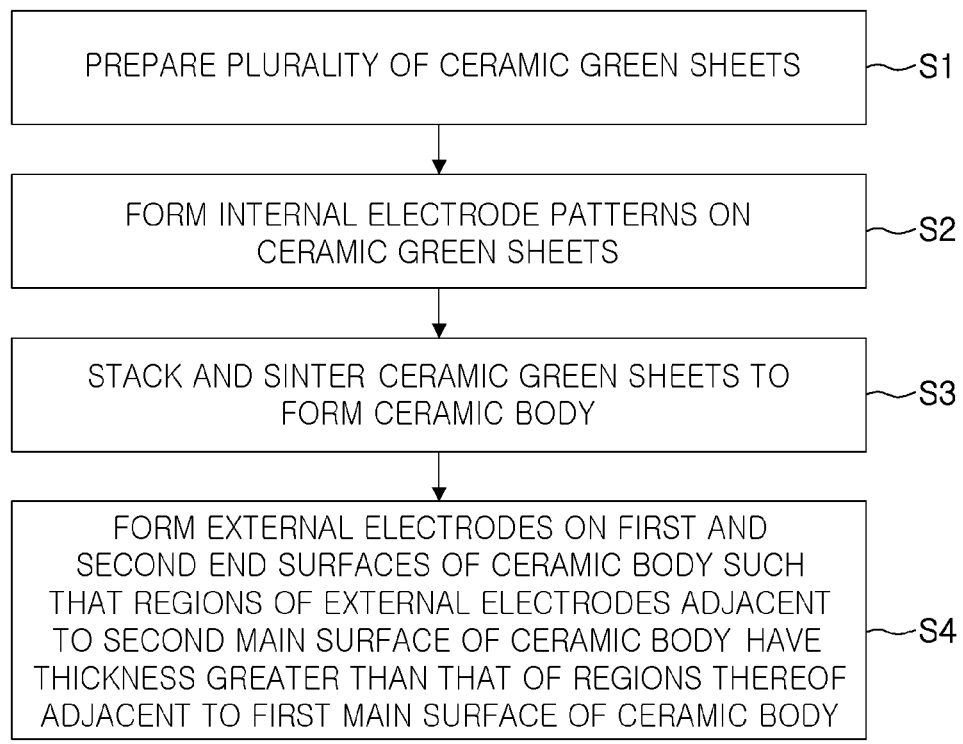
FIG. 5 is a flow chart illustrating a manufacturing method of a multilayer ceramic capacitor according to an exemplary embodiment in the present disclosure.

FIG. 5 is a flow chart illustrating a manufacturing method of a multilayer ceramic capacitor according to an exemplary embodiment in the present disclosure.

Referring to FIG. 5, a manufacturing method of a multilayer ceramic capacitor according to an exemplary embodiment in the present disclosure may include: preparing a plurality of ceramic green sheets (S1); forming internal electrode patterns on the ceramic green sheets (S2); forming a ceramic body (S3); and forming external electrodes (S4).

The preparing of the plurality of ceramic green sheets (S1) may be performed by applying slurry containing a dielectric powder to carrier films and drying the same.

The ceramic powder may be a material having high permittivity, for example, a barium titanate ($BaTiO_3$)-based material, a lead complex perovskite-based material, a strontium titanate ($SrTiO_3$)-based material, or the like, but the present disclosure is not limited thereto. Among them, a barium titanate ($BaTiO_3$) powder may preferably be used. The ceramic green sheets may be sintered, such that dielectric layers configuring a ceramic body may be formed.

The forming of the internal electrode patterns (S2) may be performed by applying an internal electrode paste containing a conductive metal to the ceramic green sheets, but a method of forming the internal electrode patterns is not limited thereto. The internal electrode paste may contain a conductive metal and in this case, the conductive metal may be Ni, Cu, Pd, or an alloy thereof, but is not limited thereto.

A method of applying the internal electrode patterns to the ceramic green sheets is not particularly limited. For example, a printing method such as a screen printing method or a gravure printing method may be used.

The forming of the ceramic body (S3) may be performed by stacking the ceramic green sheets on which the internal electrode patterns are formed and stacking the ceramic green sheets on which the internal electrode patterns are not formed on upper and lower portions of the ceramic green sheet laminate so as to form cover layers to form a ceramic multilayer body, and then, sintering the ceramic multilayer body.

Prior to the sintering process, a process of pressing the multilayer body and cutting the pressed multilayer body into individual chips in such a manner that ends of the internal electrode patterns are alternately exposed to cutting surfaces may be further included.

The forming of the external electrodes (S4) may be performed by applying an external electrode paste to outer surfaces of the ceramic body. The external electrode paste may contain a metal powder, a binder, and the like, and if necessary, the external electrode paste may further contain a glass frit.

The metal powder contained in the external electrode paste may be formed of nickel (Ni), copper (Cu), palladium (Pd), gold (Au), silver (Ag), or an alloy thereof, but the present disclosure is not limited thereto.

The glass frit may be contained in order to densify the external electrode. The glass frit may contain a $SiO_2$ based glass component, a $B_2O_3$ based glass component, or both of $SiO_2$ and $B_2O_3$, but is not limited thereto.

The external electrode paste may further contain a solvent for adjusting a viscosity if necessary.

The external electrode paste may be applied to first and second end surfaces of the ceramic body to thereby be electrically connected to the internal electrodes.

The external electrode paste may be applied to the first and second end surfaces of the ceramic body such that regions of external electrodes adjacent to a second main surface of the ceramic body are thicker than regions thereof adjacent to a first main surface of the ceramic body.

The external electrode paste may be applied by dipping the ceramic body in the external electrode paste, or by a screen printing method, or the like, but is not limited thereto.

For example, the entirety of the first and second end surfaces of the ceramic body may be primarily dipped in the external electrode paste and some regions of the first and second end surfaces thereof adjacent to the lower surface of the ceramic body may be secondarily dipped in the external electrode paste, whereby external electrodes may be formed in such a manner that portions thereof adjacent to the lower surface of the ceramic body are thicker than remaining portions thereof.

Thereafter, in the forming of the external electrodes (S4), the external electrode paste applied to the ceramic body may be sintered.

Board 200 having Multilayer Ceramic Capacitor

Figure 6:
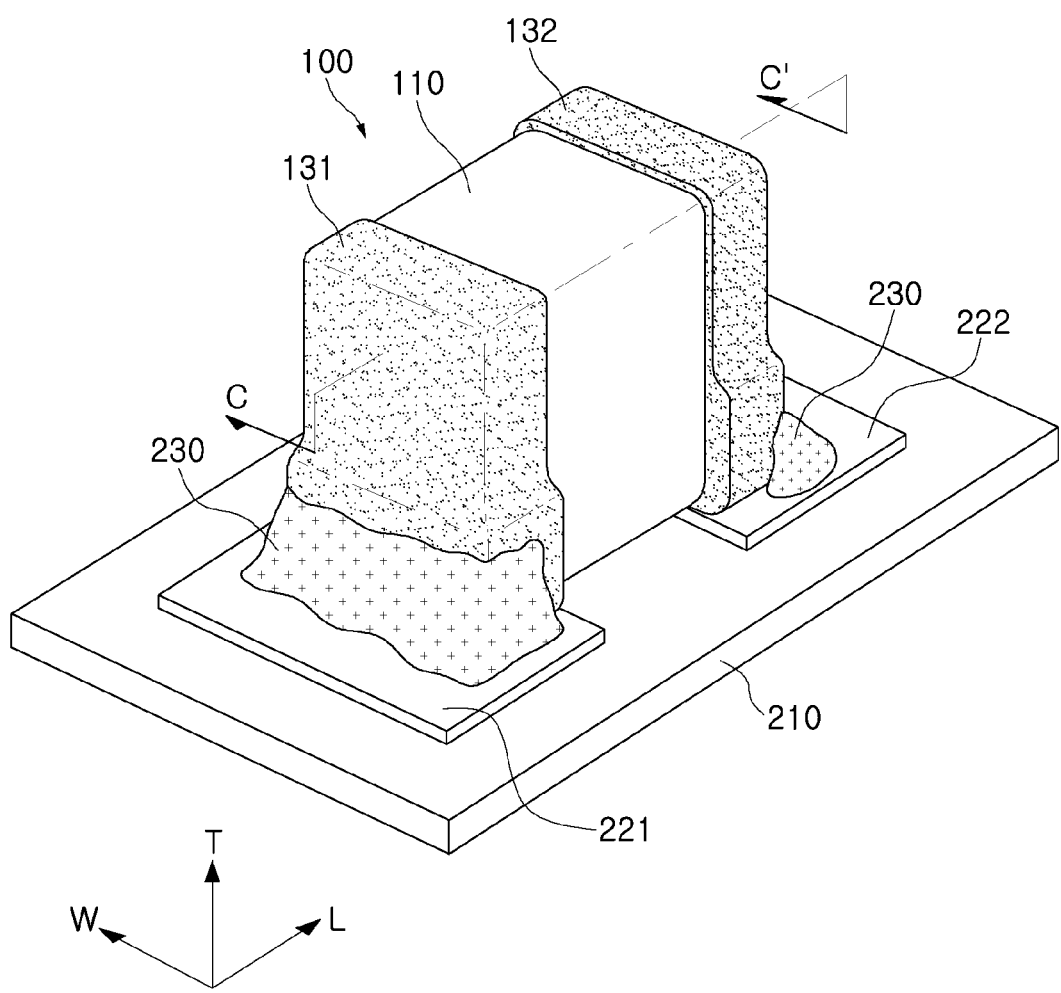
FIG. 6 is a perspective view illustrating a board having a multilayer ceramic capacitor according to an exemplary embodiment in the present disclosure.
Figure 7:
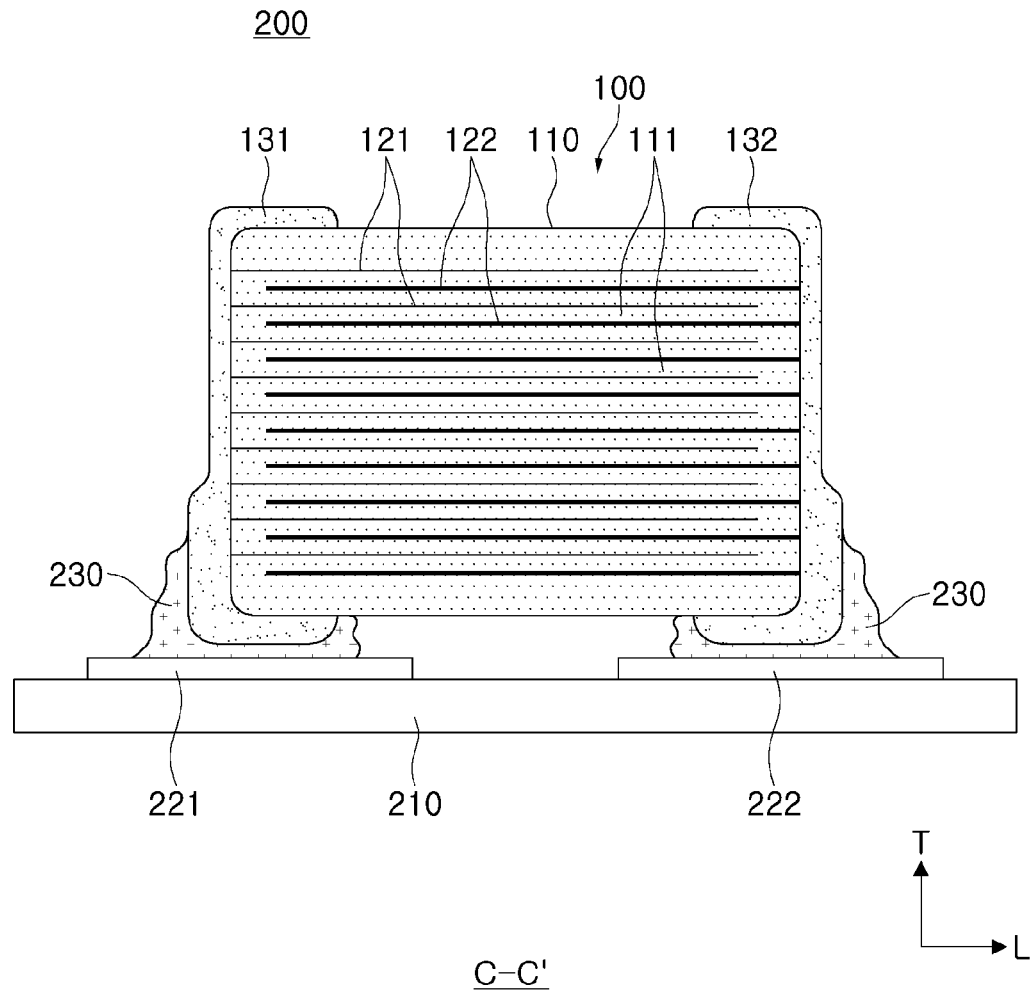
FIG. 7 is a cross-sectional view taken along line C-C' of FIG. 6.

FIG. 6 is a perspective view illustrating a board 200 having a multilayer ceramic capacitor according to an exemplary embodiment in the present disclosure; and FIG. 7 is a cross-sectional view taken along line C-C' of FIG. 6.

Referring to FIGS. 6 and 7, the board 200 having a multilayer ceramic electronic component according to an exemplary embodiment in the present disclosure may include a printed circuit board 210 on which the multilayer ceramic capacitor 100 is mounted and first and second electrode pads 221 and 222 formed on the printed circuit board 210 to be spaced apart from each other.

In this case, the multilayer ceramic electronic component 100 may be electrically connected to the printed circuit board 210 by soldering 230 in a state in which the first and second external electrodes 131 and 132 are positioned on the first and second electrode pads 221 and 222 to come into contact therewith.

That is, according to the exemplary embodiment, the board 200 having a multilayer ceramic capacitor may include: the printed circuit board having the first and second electrode pads formed thereon; and the multilayer ceramic capacitor mounted on the printed circuit board, wherein the multilayer ceramic capacitor includes a ceramic body having first and second main surfaces opposing each other in a thickness direction and first and second end surfaces opposing each other in a length direction, a thickness of the ceramic body being greater than a width thereof, a first external electrode disposed on the first end surface and having a greater thickness in a region thereof adjacent to the second main surface than in a region thereof adjacent to the first main surface, a second external electrode disposed on the second end surface and having a greater thickness in a region thereof adjacent to the second main surface than in a region thereof adjacent to the first main surface, and first and second internal electrodes disposed in the ceramic body and connected to the first and second external electrodes, respectively.

The multilayer ceramic capacitor may be mounted such that the second main surface of the ceramic body is adjacent to and faces the printed circuit board.

The multilayer ceramic capacitor 100 may include the first and second external electrodes formed on outer surfaces of the ceramic body 110 to be connected to the first and second internal electrodes, respectively. Since portions of the first and second external electrodes 131 and 132 adjacent to the lower surface of the ceramic body may be thicker than the remaining portions thereof, mounting stability may be increased at the time of mounting the multilayer capacitor on the board.

Among contents of the board having a multilayer ceramic capacitor, a description thereof overlapped with those of the above-mentioned multilayer ceramic capacitor will be omitted in order to avoid an overlapped description.

Experimental Example

The following Table 1 shows data regarding results of mounting defect rates and capacitance defect rates of the multilayer ceramic capacitors depending on a ratio b/a of a maximum thickness b of lower portions of external electrodes to a maximum thickness a of upper portions of the external electrodes.

Experiments regarding the following Table 1 were performed using multilayer ceramic capacitors each having a size of about 0.6 mm×0.3 mm×0.7 mm (length×width×thickness). In the Experimental Example, a thickness of a cover part was about 0.1 mm, a thickness of an internal electrode was about 0.8 μm, and a thickness of a dielectric layer was about 1.1 μm.

The external electrodes were formed to be substantially identical to each other on first and second end surfaces of ceramic body to which internal electrodes were exposed, and the maximum thickness a of the upper portion of the external electrode and the maximum thickness b of the lower portion thereof were variously formed as shown in the following Table 1.

The maximum thicknesses of the upper and lower portions of the external electrode were distinguished and measured based on a point corresponding to half of a thickness of the ceramic body.

The external electrode was formed by applying a conductive paste containing copper to the ceramic body and then sintering the applied conductive paste.

In the following Table 1, in a case in which the chip toppled over or the multilayer ceramic capacitor was misaligned when being mounted on a board, the case was determined to be defective in mounting aspects. In a case in which capacitance was out of ±10% of rated capacitance, the case was determined to be defective in terms of capacitance.

TABLE 1

| Sample | a (μm) | b (μm) | b/a | Mounting Defect Rate (%) | Capacitance Defect Rate (%) |
| --- | --- | --- | --- | --- | --- |
| 1* | 31 | 35 | 1.13 | 0.54 | 0.1 |
| 2* | 30 | 37 | 1.23 | 0.43 | 0.2 |
| 3* | 29 | 41 | 1.41 | 0.13 | 0.1 |
| 4 | 30 | 45 | 1.50 | 0.00 | 0.1 |
| 5 | 30 | 46 | 1.53 | 0.00 | 0.1 |
| 6 | 31 | 51 | 1.65 | 0.00 | 0.2 |
| 7 | 28 | 106 | 3.79 | 0.00 | 0.3 |
| 8 | 29 | 116 | 4.00 | 0.00 | 0.5 |
| 9* | 32 | 130 | 4.06 | 0.00 | 31.3 |
| 10* | 30 | 150 | 5.00 | 0.00 | 53.8 |

*indicates Comparative Example.

As shown in Table 1, it may be confirmed that in samples 1 to 3 in which b/a was less than 1.5, the mounting defect occurred, but in samples 4 to 10 in which b/a was 1.5 or more, the mounting defect did not occur.

In addition, it may be confirmed that in samples 9 and 10 in which b/a was greater than 4, the capacitance defect rate was significantly increased. In samples 9 and 10, since a volume occupied by the external electrode was large, the ceramic body needed to have a relatively small size in order to satisfy the standard of the overall size of the multilayer ceramic capacitor, such that the capacitance defect rate could be increased.

Referring to Table 1, it may be confirmed that in samples 4 to 8 in which b/a was equal to or greater than 1.5 and equal to or smaller than 4, the mounting defect did not occur and the capacitance defect rate was low.

As set forth above, according to exemplary embodiments in the present disclosure, the multilayer ceramic capacitor allowing for a decrease in a phenomenon in which the chip topples over while having excellent mounting stability when the multilayer ceramic capacitor is mounted on a board, the manufacturing method thereof, and the board having the same may be provided.

While exemplary embodiments have been shown and described above, it will be apparent to those skilled in the art that modifications and variations could be made without departing from the scope of the invention as defined by the appended claims.

What is claimed is:

1. A multilayer ceramic capacitor comprising:
a ceramic body having first and second main surfaces opposing each other in a thickness direction and first and second end surfaces opposing each other in a length direction, a thickness of the ceramic body being greater than a width thereof;
a first external electrode disposed on the first end surface and having a greater thickness in a region thereof adjacent to the second main surface than in a region thereof adjacent to the first main surface;
a second external electrode disposed on the second end surface and having a greater thickness in a region thereof adjacent to the second main surface than in a region thereof adjacent to the first main surface; and
first and second internal electrodes disposed in the ceramic body and connected to the first and second external electrodes, respectively,
wherein the first and second external electrodes comprise a glass frit through an entire region from an internal surface of the first and second external electrodes to an end surface of the first and second external electrodes both in the region thereof adjacent to the first main surface, and in the region thereof adjacent to the second main surface, and
wherein a thickness of the first external electrode at a point corresponding to an uppermost internal electrode among the first internal electrodes is smaller than that at a point corresponding to a lowest internal electrode among the first internal electrodes, and a thickness of the second external electrode at a point corresponding to an uppermost internal electrode among the second internal electrodes is smaller than that at a point corresponding to a lowest internal electrode among the second internal electrodes.

2. The multilayer ceramic capacitor of claim 1, wherein a ratio between a maximum thickness 'b' of lower portions of the first and second external electrodes adjacent to the second main surface, and a maximum thickness 'a' of upper portions of the first and second external electrodes adjacent to the first main surface, satisfies the inequality: $1.5 \leq b/a \leq 4$.

3. The multilayer ceramic capacitor of claim 1, wherein a center of gravity of the multilayer ceramic capacitor is positioned below a center of gravity of the ceramic body.

4. The multilayer ceramic capacitor of claim 1, wherein the multilayer ceramic capacitor is configured to be mounted on a board, and the first and second internal electrodes extend perpendicularly to a mounting surface of the ceramic body that is configured to face the board when the multilayer ceramic capacitor is mounted thereon.

5. The multilayer ceramic capacitor of claim 1, wherein the multilayer ceramic capacitor is configured to be mounted on a board, and the first and second internal electrodes extend parallel to a mounting surface of the ceramic body that is configured to face the board when the multilayer ceramic capacitor is mounted thereon.

6. The multilayer ceramic capacitor of claim 1, wherein each of the first and second external electrodes includes a band portion extending onto the second main surface of the ceramic body.

7. An assembly having a multilayer ceramic capacitor, the assembly comprising:
a printed circuit board having first and second electrode pads formed thereon; and
the multilayer ceramic capacitor mounted on the printed circuit board,
wherein the multilayer ceramic capacitor includes a ceramic body having first and second main surfaces opposing each other in a thickness direction and first and second end surfaces opposing each other in a length direction, a thickness of the ceramic body being greater than a width thereof, a first external electrode disposed on the first end surface and having a greater thickness in a region thereof adjacent to the second main surface than in a region thereof adjacent to the first main surface, a second external electrode disposed on the second end surface and having a greater thickness in a region thereof adjacent to the second main surface than in a region thereof adjacent to the first main surface, and first and second internal electrodes disposed in the ceramic body and connected to the first and second external electrodes, respectively,
wherein the first and second external electrodes comprise a glass frit through an entire region from an internal surface of the first and second external electrodes to an end surface of the first and second external electrodes both in the region thereof adjacent to the first main surface, and in the region thereof adjacent to the second main surface, and
wherein a thickness of the first external electrode at a point corresponding to an uppermost internal electrode among the first internal electrodes is smaller than that at a point corresponding to a lowest internal electrode among the first internal electrodes, and a thickness of the second external electrode at a point corresponding to an uppermost internal electrode among the second internal electrodes is smaller than that at a point corresponding to a lowest internal electrode among the second internal electrodes.

8. The assembly of claim 7, wherein the multilayer ceramic capacitor is mounted such that the second main surface of the ceramic body is adjacent to and faces the printed circuit board.

9. The assembly of claim 7, wherein a ratio between a maximum thickness 'b' of lower portions of the first and second external electrodes adjacent to the second main surface, and a maximum thickness 'a' of upper portions of the first and second external electrodes adjacent to the first main surface, satisfies the inequality: $1.5 \leq b/a \leq 4$.

10. The assembly of claim 7, wherein a center of gravity of the multilayer ceramic capacitor is positioned below a center of gravity of the ceramic body.

* * * * *